United States Patent
Koren et al.

(10) Patent No.: US 10,019,513 B1
(45) Date of Patent: Jul. 10, 2018

(54) WEIGHTED ANSWER TERMS FOR SCORING ANSWER PASSAGES

(71) Applicant: Google LLC, Mountain View, CA (US)

(72) Inventors: Yehuda Arie Koren, Zichron Yaakov (IL); Lev Finkelstein, Netanya (IL)

(73) Assignee: Google LLC, Mountain View, CA (US)

( * ) Notice: Subject to any disclaimer, the term of this patent is extended or adjusted under 35 U.S.C. 154(b) by 506 days.

(21) Appl. No.: 14/824,533

(22) Filed: Aug. 12, 2015

Related U.S. Application Data

(60) Provisional application No. 62/036,457, filed on Aug. 12, 2014.

(51) Int. Cl.
*G06F 17/00* (2006.01)
*G06F 17/30* (2006.01)

(52) U.S. Cl.
CPC .. *G06F 17/30684* (2013.01); *G06F 17/30424* (2013.01); *G06F 17/30654* (2013.01); *G06F 17/30705* (2013.01)

(58) Field of Classification Search
CPC ................................................ G06F 17/30424
See application file for complete search history.

(56) References Cited

U.S. PATENT DOCUMENTS

| | | | |
|---|---|---|---|
| 7,181,447 B2 | 2/2007 | Curtis | |
| 7,844,598 B2 | 11/2010 | Masuichi | |
| 7,953,720 B1 | 5/2011 | Rohde | |
| 8,122,042 B2 | 2/2012 | Pan | |
| 8,145,617 B1 | 3/2012 | Verstak | |
| 8,380,713 B2 | 2/2013 | Oh | |
| 8,463,791 B1 | 6/2013 | Bierner | |
| 8,738,362 B2 | 5/2014 | Ferrucci | |
| 8,738,617 B2 | 5/2014 | Brown | |
| 2006/0224582 A1 | 10/2006 | Hogue | |
| 2009/0287678 A1* | 11/2009 | Brown | ............... G06F 17/30 |
| 2010/0235311 A1* | 9/2010 | Cao | ........... G06F 17/30867 706/46 |

(Continued)

FOREIGN PATENT DOCUMENTS

WO    WO2012040674 A3    7/2012

OTHER PUBLICATIONS

Su et al., "Indexing Relational Database Content Offline for Efficient Keyword-Based Search," Stanford University, 2005, 13 pages.

(Continued)

*Primary Examiner* — Ajith Jacob
(74) *Attorney, Agent, or Firm* — Fish & Richardson P.C.

(57) ABSTRACT

Methods, systems, and apparatus, including computer programs encoded on a computer storage medium, for generating answer terms for scoring answer passages. In one aspect, a method includes accessing resource data describing a set of resources, identifying question phrases in the resources, for each identified question phrase in a resource, selecting in the resource a section of text subsequent to the question phrase as an answer, the answer having a plurality of terms, grouping the question phrases into groups of question phrases, and for each group: generating, from the terms of the answers for each question phrase in the group, answer terms and for each answer term, an answer term weight, and storing the answer terms and answer term weights in association with one or more queries.

18 Claims, 7 Drawing Sheets

(56) References Cited

U.S. PATENT DOCUMENTS

2011/0047171 A1  2/2011  Paparizos
2012/0084293 A1  4/2012  Brown
2013/0262501 A1  10/2013 Kuchmann-Beauger
2014/0141399 A1  5/2014  Agarwal

OTHER PUBLICATIONS

Wu et al., "Corroborating Answers from Multiple Web Sources," Proceedings of the 10th International Workshop on Web and Databases, 2007, 6 pages.

* cited by examiner

WEIGHTED ANSWER TERMS FOR SCORING ANSWER PASSAGES

CLAIM OF PRIORITY

This application claims priority under 35 USC § 119(e) to U.S. Patent Application Ser. No. 62/036,457, filed on Aug. 12, 2014, the entire contents of which are hereby incorporated by reference.

BACKGROUND

This specification relates to search engine query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, the capital of a state, etc. When queries that are in the form of a question are received, some search engines may perform specialized search operations in response to the question format of the query. For example, some search engines may provide information responsive to such queries in the form of an "answer," such as information provided in the form of a "one box" to a question.

Some question queries are better served by explanatory answers, which are also referred to as "long answers" or "answer passages." For example, for the question query [why is the sky blue], an answer explaining Rayleigh scatter is helpful. Such answer passages can be selected from resources that include text, such as paragraphs, that are relevant to the question and the answer. Sections of the text are scored, and the section with the best score is selected as an answer.

SUMMARY

In general, one innovative aspect of the subject matter described in this specification can be embodied in methods that include the actions of accessing resource data describing a set of resources; identifying question phrases in the resources; for each identified question phrase in a resource, selecting in the resource a section of text subsequent to the question phrase as an answer, the answer having a plurality of terms; grouping the question phrases into groups of question phrases, and for each group: generating, from the terms of the answers for each question phrase in the group, answer terms and for each answer term, an answer term weight, and storing the answer terms and answer term weights in association with one or more queries.

Particular embodiments of the subject matter described in this specification can be implemented so as to realize one or more of the following advantages. Answers can be checked for likely accuracy without a prior knowledge of the answer. A potentially large number of answer text sections for corresponding question phrases can be analyzed, and the contribution of particular answer text passage for answers that are likely to be the most accurate is increased. In some implementations, the pre-processing of answer text is used to generate weighted term vectors prior to query time. Thereafter, use of the weighted term vector at query time provides a lightweight but highly accurate scoring estimate of the accuracy of an answer passage. This improves the technology of answer generation. In particular, the generation of the term vector facilitates the ability to harness a multitude of available relevant answers, including those excluded from the top ranked resources for a query, by which the relevance of a candidate answer can be judged. Accordingly, long answers that are more likely to satisfy the informational need of users are more likely to surface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
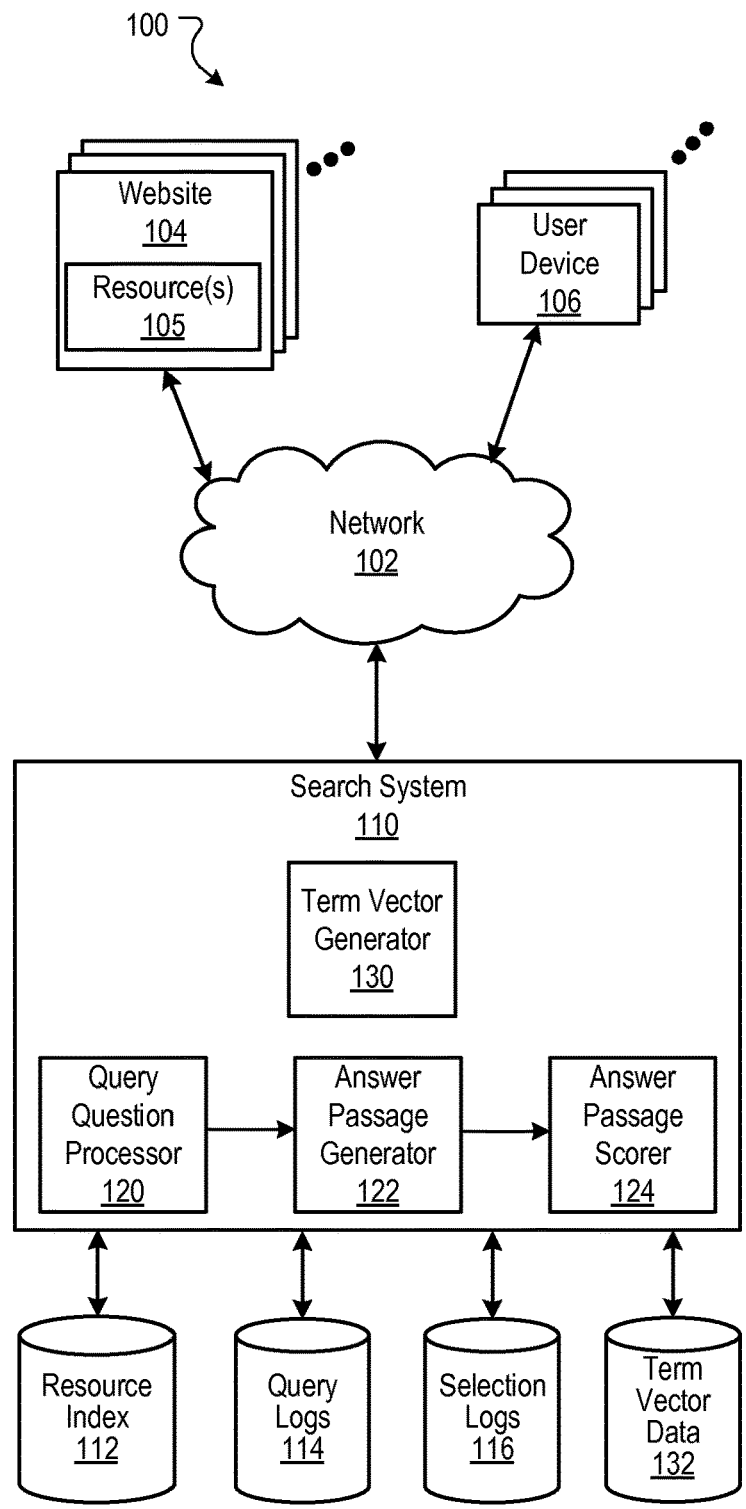
FIG. 1 is an illustration of an environment in which answer terms for a variety of questions are collected from resources and weighted to generate weighted answer terms.

A term vector generator generates answer terms, and for each answer term, a term weight, and associates the answer terms and term weights with a query definition. In the example description that follows, the answer terms and term weights are stored in a vector format. However, any appropriate data structure may be used to store the answer terms and term weights. The query definition may be a single query, or may be a set of queries that are grouped together as similar queries, or may be a set of terms that can be expanded for query matching to queries.

To generate the answer terms and weights for a query definition, the term vector generator accesses resource data describing a set of resources. Such resource data may be a web index, for example. The term vector generator identifies question phrases in the resources, and for each identified question phrase in a resource, selects in the resource a section of text subsequent to the question phrase as an answer. The question phrases are then grouped into separate groups. The grouping of the question phrases may be done in a variety of ways. For example, the question phrases may be grouped according to a clustering algorithm by which questions phrases that are similar to each other are grouped into a cluster. Alternatively, questions phrases that match a query definition may be grouped together.

Then, for each group of question phrases, the term vector generator generates, from the terms of the answers, answer terms and for each answer term, an answer term weight. The term vector generator then stores the answer terms and answer term weights in association with a query definition as a term vector. In some implementations, each query definition has one corresponding term vector.

At query time, when a question query from a user device is received, an answer passage generator receives the query data identifying resources determined to be responsive to the query. The resources are ordered according to a ranking. For each resource in a top-ranked subset of the resources, the answer passage generator generates candidate answer passages from the resources. Each candidate answer passage is eligible to be provided as an answer passage with search results that identify the resources determined to be responsive to the query, but separate and distinct from the search results, e.g., as in an "answer box."

After the answer passages are generated, an answer passage scorer scores each passage. Multiple scoring components can be computed, one of which includes an answer term vector score. To compute the term vector score, the answer passage scorer determines a query definition that matches the received query, and selects the answer term vector associated with the query definition. Using the answer term vector, the answer passage scorer scores each candidate answer passages based on terms of the candidate answer passage, and the answer terms and the term weights of the answer term vector. The answer passage scorer then selects an answer passage from the candidate answer passages based, in part, on the scoring of the candidate answer passages based on the selected answer term vector. The selected candidate answer passage is then provided with the search results.

These features and addition features are described in more detail in the sections that follow.

Example Operating Environment

FIG. 1 is an illustration of an environment 100 in which answer terms for a variety of questions are collected from resources and weighted to generate weighted answer terms. As will be described in more detail below, in one example implementation, a term vector generator 130 generates answer term vector data 132 that is used to evaluate answer passages. In some implementations, the term vector data 132 is generated prior to query time, e.g., by a back end process that generates the term vector data 132 that is then later used by the search system 110 during query processing.

As show in FIG. 1, the term vector generator 130 is depicted as a subsystem of the search system 130. However, the term vector generator 130 may also be a system that operates completely independent of the search system 110, and generates the data for use by the search system 110.

Evaluation of answer passages using the term vector data 132 by search system 110 is first described to provide a contextual example of how the term vector data 132 may be used in a search operation. Thereafter, generation of the term vector data 132, which typically occurs prior to query time, is described.

Search Processing

A computer network 102, such as the Internet, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

A user device 106 is an electronic device capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 crawls the publisher websites 104 and indexes the resources provided by the publisher websites 104. The index data are stored in a resource index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and, optionally, a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116.

The query logs 114 and the selection logs 116 define search history data 117 that include data from and related to previous search requests associated with unique identifiers. The selection logs represent actions taken in response to search results provided by the search engine 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Question Queries And Answer Passages

As described above, some queries are in the form of question, or in the form of an implicit question. For example, the query [distance of earth to moon] is in the form of an implicit question "What is the distance of the earth from the moon?" Likewise, a question may be specific, as in the query [How far away is the moon]. The search system 110 includes a query question processor 120 that utilizes processes to determine if a query is a query question, and, if so, to trigger the generation of answers that are responsive to the question. The query question processor 120 can use a variety of different algorithms to determine whether a query is a question. For example, the query question processor 120 may utilize language models, machine learned processes, knowledge graphs, grammars, or combinations thereof to determine question queries and answers.

In some implementations, the search system 110 may select candidate answer passages in addition to or instead of an answer fact. For example, for the query [how far away is the moon], an answer fact is 238,900 miles, which is the average distance of the Earth from the moon. However, the search system 110 includes an answer passage generator 122 that generates candidate answer passages, and an answer passage scorer 124 that scores the candidate answer passages. Based on these scores, one passage is selected and provided in response to the query.

The candidate answer passages are generated from the resources that are identified as being responsive to the query. The answer passage generator can use a variety of passage selection processes to generate candidate answer passages. In some implementations, the answer passage generator only uses the top N ranked resources to generate and score the answer passages. In the sections that follow, the use of the top N ranked resources is described. However, a larger set of resources can also be used.

Figure 2:
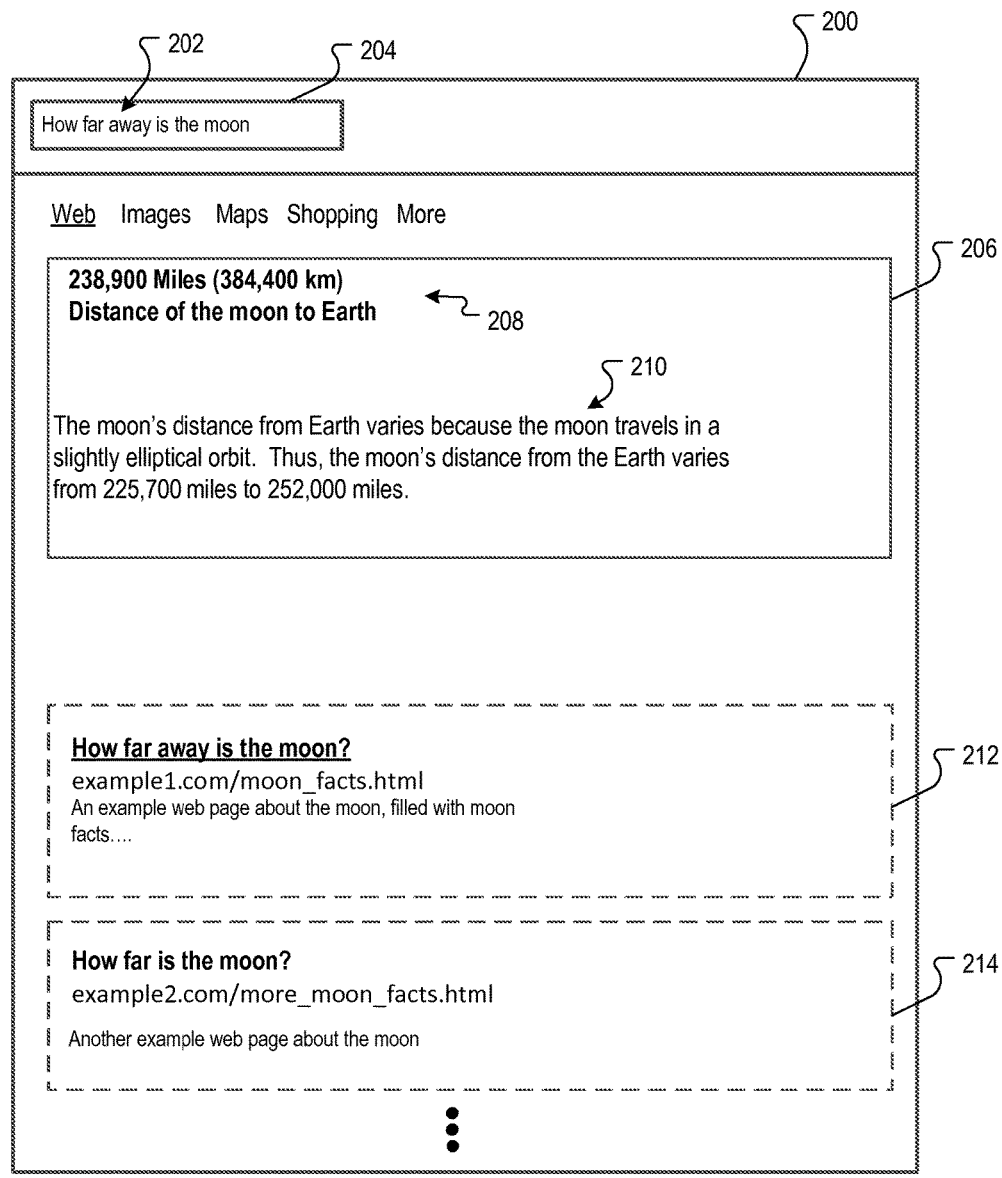
FIG. 2 is an illustration of a search results resource in which an answer passage is provided with an answer to a question query.

FIG. 2 is an illustration of a search results resource 200 in which an answer passage is provided with an answer to a question query. The query 202 [How far away is the moon] has been input in the input field 204. The query question processor 120 identifies the query as a question query, and also identifies the answer 208 "289,900 Miles (364,400 km)." The search system 110, in connection with the query question processor 120, provides an answer box 206 in response to the determination that the query is a question query and that an answer is identified. The answer box 206 includes the answer 208.

Additionally, the answer box 206 includes an answer passage 210 that is generated and selected by the answer passage generator 122 and the answer passage scorer 124. The answer passage 210 is one of multiple answer passages that were processed by the answer passage generator 122 and the answer passage scorer 124. Additional information, such as search results 212 and 214, can also be provided on the search results page. The search results are separate and distinct from the answer passage 210.

Figure 3:
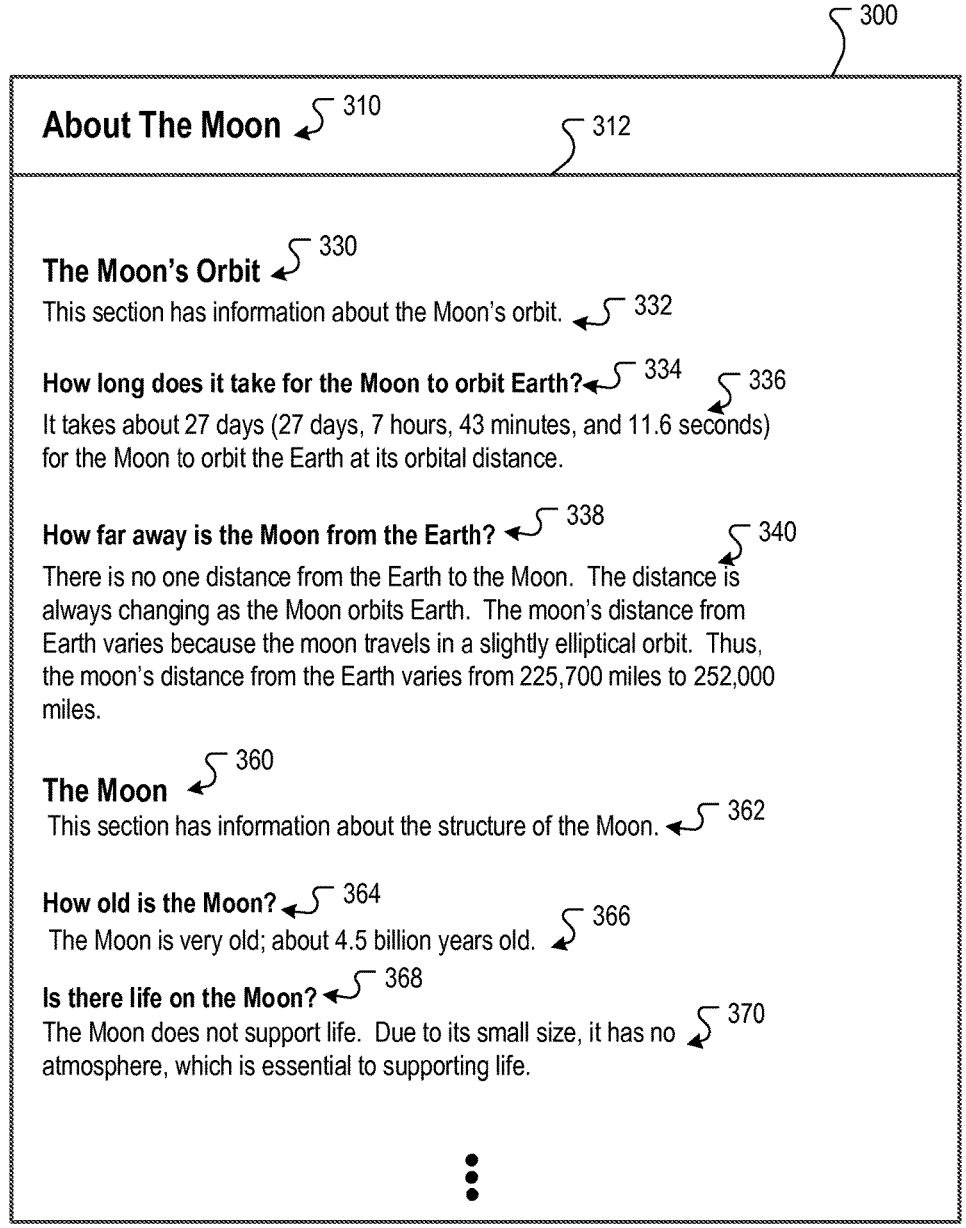
FIG. 3 is an illustration of a web page resource from which the answer passage of FIG. 2 was selected.

FIG. 3 is an illustration of a web page resource 300 from which the answer passage 210 of FIG. 2 was selected. The web page resources 300 is, for example, one of the top ranked resources responsive to the query [How far away is the moon] and the answer passage generator 122 can generate multiple candidate answer passages from the content of the resource 300. The resource 300 includes multiple heading 310, 330, 334, 338, 360, 364, and 368. Headings 330, 334, 338, 360, 364, and 368 have respective corresponding text sections 332, 336, 340, 362, 366 and 370 that are subordinate. As used herein, a section is subordinate to a heading when the structure is such that the section directly "descends" from the heading. A text section need not be adjacent to the heading to which it is subordinate; for example, a heading may be linked in a resource that causes the browser to scroll to another portion of the resource so that the viewport is focused on the text section. In the context of a document object model, a text section is subordinate to a heading when it is subordinate body text to the heading. For example, in FIG. 3, the text 340 is subordinate to the heading 338; but it is not subordinate to the heading 334, 330, or 310.

As will be described in more detail below, multiple different candidate answer passages are generated from the resource 300 and scored. For example, with respect to FIG. 3, the following candidate answer passages may be among many generated by the answer passage generator 122 from the resource 300:

(1) It takes about 27 days (27 days, 7 hours, 43 minutes, and 11.6 seconds) for the Moon to orbit the Earth at its orbital distance.

(2) The moon's distance from Earth varies because the moon travels in a slightly elliptical orbit. Thus, the moon's distance from the Earth varies from 225,700 miles to 252,000 miles.

(3) Thus, the moon's distance from the Earth varies from 225,700 miles to 252,000 miles.

The answer passages are scored by the answer passage scorer 124, and the answer passage with the highest score is selected and provided with the search results. As described above, a variety of scoring components can be generated, including query dependents scores, query independents scores, etc. Each scoring component can be combined into a final answer score that is used as a final score for candidate answer passage selection.

One such component score is an answer term score. The answer term score is a score computed for each candidate answer passage. To compute the score for each candidate answer passage, the answer passage scorer 124 compares an answer term vector associated with the received query to each candidate answer passage. The answer term vectors for queries are stored in the term vector data 132.

Generation of the term vectors is described with reference to FIGS. 4 and 5 below, and the use of the term vectors to compute the term vector score is described with reference to FIGS. 6 and 7 below.

Generating of Term Vectors for Use in Search Processing

Figure 4:
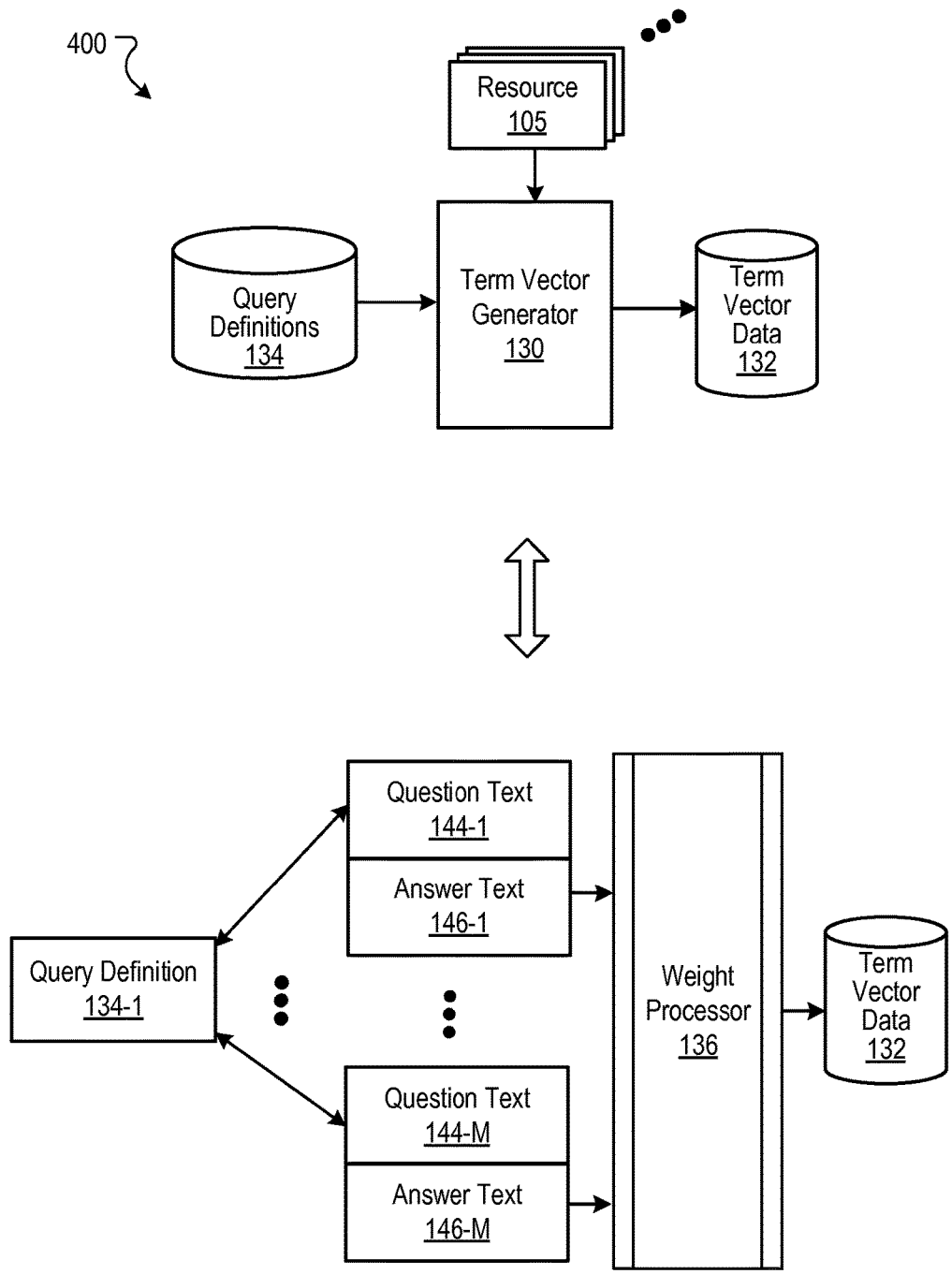
FIG. 4 is a system flow diagram illustrating a system flow during the generation of an answer term vector.
Figure 5:
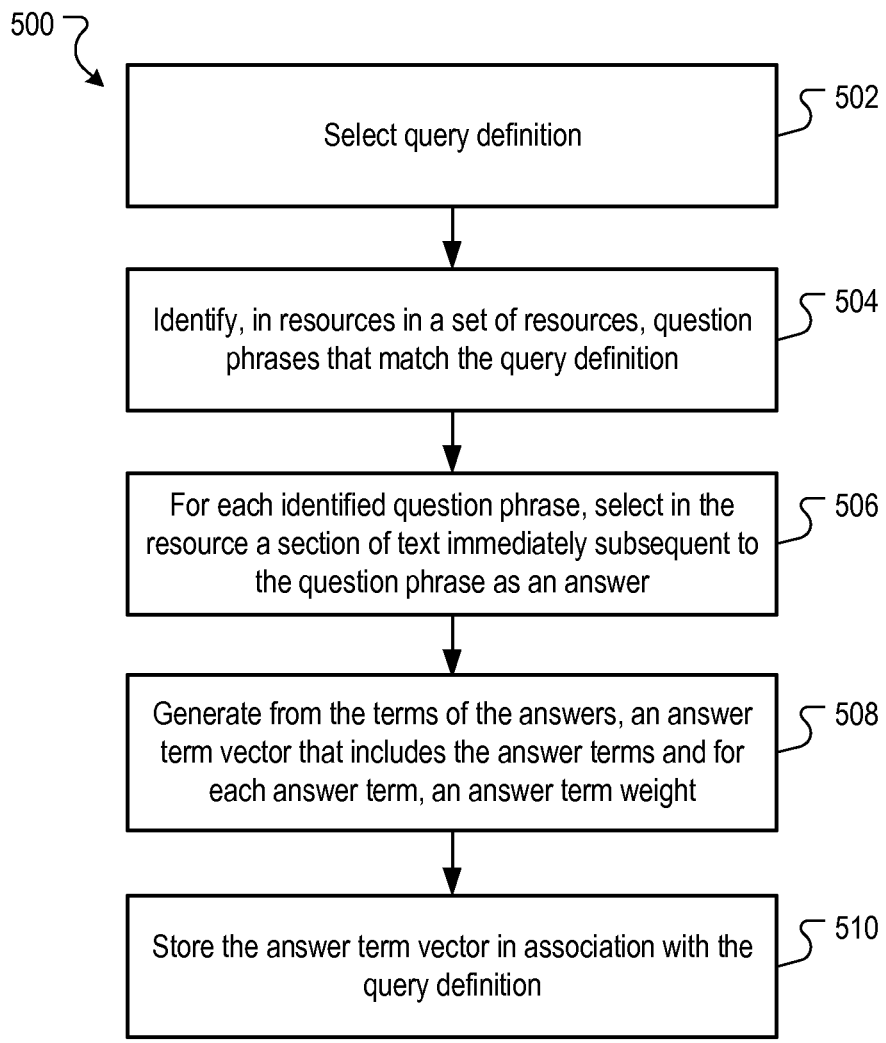
FIG. 5 is a flow diagram of an example process for generating an answer term vector.

FIG. 4 is a system flow diagram 400 illustrating a system flow during the generation of an answer term vector. The operation of the system flow 400 is describe with reference to FIG. 5, which is a flow diagram of an example process 500 for generating an answer term vector. The process 500 is implemented in a data processing apparatus, such as one or more computers in a search system 110 and that are programmed to perform the operations of a term vector generator 130. The process 500 is typically done independent of query time, e.g., such as in the pre-processing of search data that is used for scoring answer passages. The process 500 is done for multiple query definitions.

As used in this document, a "query definition" is data that, at query time, are used to match a received query to a term vector. A query definition may be a single query, or may be a set of queries that are grouped together as similar queries, or may be a set of terms that can be expanded for query matching to queries. The query definitions may be provided to the term vector generator from another subsystem in the form of query definitions 134.

The term vector generator 130 selects a query definition (502). As described above, the query definition may be a single query in query log, or may be a set of queries that are determined to be similar queries, or may be a set of terms that can be used parse to a set of queries. An example of the latter is [distance earth moon far elliptical apogee perigee].

The term vector generator 130 identifies, in resources in a set of resources, question phrases that match the query definition (504). For example, the term vector generator 130 may process sections of text from each resource to identify sections that include an interrogative term, which is a term that introduces or signals a question. Such interrogative terms includes "how," "when," "why," "where," question marks, etc. Alternatively, language models can be used to determine if a section of text is a question phrase. Other appropriate ways of detecting a question phrase in a section of text can also be used.

In some implementations, the analysis of question phrases in a resource may be limited to headers. The header text is identified by the use of markup tags. For example, with reference to FIG. 3, only the text of headers 330, 334, 338, 360, 364, and 368 are evaluated for question phrases, and the headers 334, 338, 364 and 368 are identified as question phrases. In other implementations, all text in the resource can be evaluated.

When a question phrase is detected, the term vector generator 130 also determines whether the question phrase matches the query definition. A match determination can be made in a variety of ways, and may depend on what type of query definition is used. For example, if the query definition is a single query, stop words may be removed from both the question phrase and the query, and the similarity of the two term sets may be evaluated. If the similarity meets a threshold, a match is determined.

When multiple queries are used for a query definition, then the process above can be repeated for each query in the query definition, and a match determined for any one query results in a match to the query definition.

When a set of terms is used for the query definition, stop words may be removed from the question phrase, and the similarity of the two term sets may be evaluated. If the similarity meets a threshold, a match is determined.

For example, with reference to FIG. 3, for the query definition of [distance earth moon far elliptical apogee perigee], only the header 338, with the text "How far away is the Moon from the Earth?], results in a match to the query definition.

The term vector generator 130, for each identified question phrase, selects in the resource a section of text immediately subsequent to the question phrase as an answer (506).

The term vector generator 130 can use a variety of text selection rules to select the answer text. In the case of structured HTML data, an entire paragraph immediately subordinate to a header can be selected. For example, in FIG. 3, the entire paragraph 340 is selected as answer text. In other implementations, up to M sentences are selected or until the end of the resource or a formatting break occurs. The value of M can be any number, such as 1, 3, or 5. Other text selection processes can also be used.

With reference to FIG. 4, the above steps are performed for many resources. Thus, for any given query definition, such as query definition 134-1 depicted in FIG. 4, there may be multiple matching question phrases identified, as depicted by question text sections 144-1 . . . M. Likewise, there may be multiple answers selected, as depicted by answer text sections 146-1 . . . M.

Some the instances of question text 142 may match each other exactly, as in the case of material that has been reproduced on multiple sites. In some implementations, the instances need not be unique, and each matching phrase is used to select answer text. Multiple instances of the same text may be indicative of the quality of the text.

In other implementations, when two question phrases are an exact match to each other, the answer text from both are used only if the answer text from each are not an exact match to each other. Otherwise, only one instance of the answer text is used.

The term vector generator 130 generates, from the terms of the answers, an answer term vector that includes the answer terms and for each answer term, an answer term weight (508). A variety of appropriate weighting processes 136 can be used. For example, for each term, the answer term weight can be based on the number of times the answer term occurs in the answer text for all selected answers. Alternatively, the answer term weight can be based on the number of answers the answer term occurs in. The weight of each term may be further based on term specific parameters, such as inverse document frequency, term frequency, and the like.

In some implementations, the occurrence weight contribution for a term in a particular answer may be scaled in proportion to the similarity of the query definition to the question phrase to which the text of the answer is immediate subsequent. For example, assume a first answer follows a question phrase that has a similarity score of 0.97 to a query definition, and a second answer follows a question phrase that has a similarity score of 0.82 to the query definition. Both answers include one occurrence of the term "distance."

The contribution for the first answer for the term may be 0.97, and the contribution for the second answer may be 0.82. Other scaling and adjustments may also be used.

In some implementations, the term weights may be normalized. Furthermore, term weights for stop words may be set to null values, or stop words may be omitted from the term vector.

The term vector generator 130 stores the answer term vector in association with the query definition (510). Thus, each query definition has an associated term vector, which is stored in the term vector data.

A resource may contribute an answer to more the one query definition. For example, the resource 300 would also be used to generation answer text for such query definitions that match to the queries [How long is the moon's orbit], which would result in answer text 332, and [age of the moon], which would result in answer text 366, etc.

In another implementation, question phrases may be grouped independent of any query definition. Instead, the question phrases are grouped by their similarity to each other, e.g., by means of a clustering algorithm. Then, for each group, the term vector generator 130 generates an answer term vector. In particular, from the terms of the answers for each question phrase in the group, the term vector generator 130 generates answer terms, and for each answer term, an answer term weight from the answers that correspond to the question phrases.

The answer terms and answer term weights are then in association with one or more queries. For example, a query having terms that mostly closely match the terms of a particular cluster of question phrases may be associated with the answer term vector generated for that cluster.

Scoring Candidate Answer Passages

Figure 6:
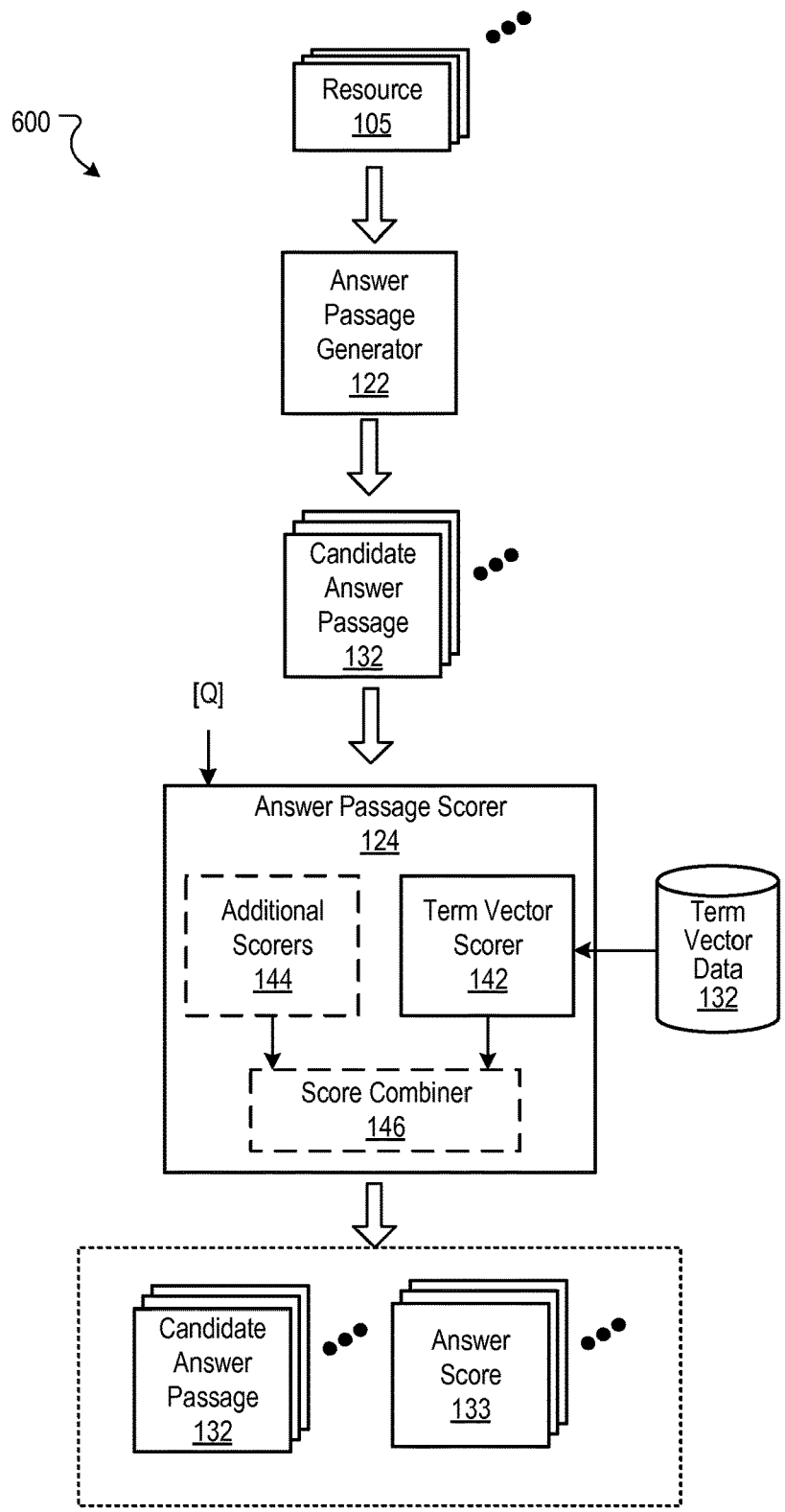
FIG. 6 is a system flow diagram illustrating a system flow during the scoring of candidate answer passages using an answer term vector.
Figure 7:
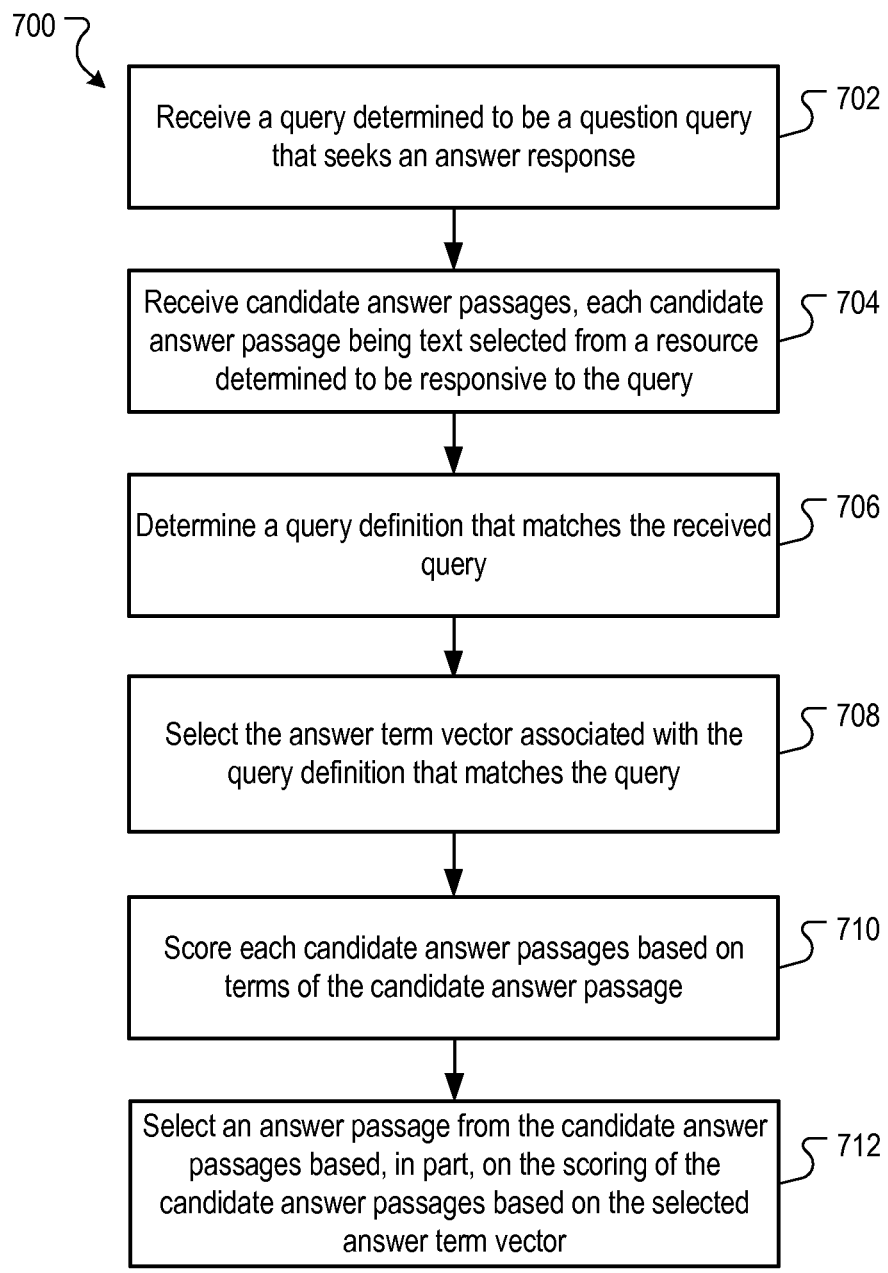
FIG. 7 is a flow diagram of an example process for the scoring of candidate answer passages using an answer term vector.

FIG. 6 is a system flow diagram 600 illustrating a system flow during the scoring of candidate answer passages using an answer term vector. The operation of the system flow 600 is described with reference to FIG. 7, which is a flow diagram of an example process 700 for the scoring of candidate answer passages using an answer term vector.

The process 700 is implemented in a data processing apparatus, such as one or more computers in a search system 110 and that are programmed to perform the operations of a term vector scorer 142. The process 700 is done at query time, e.g., in response to receive a query from a user device.

The term vector scorer 142 receives a query determined to be a question query that seeks an answer response (702). For example, as shown in FIG. 6, the term vector scorer 142 receives the query Q, e.g., [How far away is the moon], which was processed by the search system 110 and that was provided by a user device 106.

The term vector scorer 142 receives candidate answer passages, each candidate answer passage being text selected from a resource determined to be responsive to the query (704). For example, as shown in FIG. 6, term vector scorer 142 receives candidate answer passages generated by the answer passage generator 122. The passages may have been generated from the top N resource identified in response to the query.

The term vector scorer 142 determines a query definition that matches the received query (706). For example, if the query definition is a query or a set of queries, then the received query is used to look up a matching query in a query definition in the term vector data. Alternatively, if the query definition specifies multiple matching queries by a set of parsing terms that can be used to parse a received query, then a query definition with a highest parse score is selected.

The term vector scorer 142 selects the answer term vector associated with the query definition that matches the query (708). Each query definition has a corresponding term vector. The term vector of the matching query definition is selected.

The term vector scorer 142 scores each candidate answer passages based on terms of the candidate answer passage (710). A variety of scoring processes can be used. One example scoring technique calculates, for each term, the number of occurrences of a term in a passage and multiplies the number by the term weight. For example, assume the term "moon" occurs two times in a candidate answer passage, the term value for "moon" for that candidate answer passage is 0.75. Also assume the same term occurs three times in a different candidate answer passage. The scoring contribution of "moon" for the first passage is 1.5 (2×0.75), and the scoring contribution for the second passage is 2.25 (3×0.75). The contributing term values for each passage are then combined (e.g., summed) to determine a term vector score for the passage. Other scoring calculations based on weights and occurrences can also be used.

If additional scoring techniques are used, such as indicated by the additional scores 144 in FIG. 6, then additional scores and the term vector scores are combined in a score combiner 156 to form a final set of answer scores 133. Alternatively, the term vector score may be used as the answer score.

The answer passage scorer 124 selects an answer passage from the candidate answer passages based, in part, on the scoring of the candidate answer passages based on the selected answer term vector (712). The candidate answer passage with the highest answer score is selected and provided with the search results. An example search results page with an answer passage is shown in FIG. 2.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   accessing resource data describing a set of resources;
   identifying question phrases in the resources;
   for each identified question phrase in a resource, selecting in the resource a section of text subsequent to the question phrase as an answer, the answer having a plurality of terms;
   grouping the question phrases into groups of question phrases, and for each group:
      generating, from the terms of the answers for each question phrase in the group, answer terms and for each answer term, an answer term weight; and
      storing the answer terms and answer term weights in association with one or more queries;
   wherein:
   grouping the question phrases into groups of question phrases comprises clustering the question phrases into clusters based on one or more cluster similarity metrics; and
   storing the answer terms and answer term weights in association with one or more queries comprises:
      identifying queries that meet a threshold similarity measure a corresponding cluster of question phrases; and
      storing, in association with the query definition, the answer terms and answer term weights generated from the answers selected in response to the question phrases belonging to the cluster.

2. A method performed by data processing apparatus, the method comprising:
   accessing resource data describing a set of resources;
   identifying question phrases in the resources;
   for each identified question phrase in a resource, selecting in the resource a section of text subsequent to the question phrase as an answer, the answer having a plurality of terms;
   grouping the question phrases into groups of question phrases, and for each group:
      generating, from the terms of the answers for each question phrase in the group, answer terms and for each answer term, an answer term weight; and
      storing the answer terms and answer term weights in association with one or more queries;
   wherein:
   grouping the question phrases into groups of question phrases comprises:
      accessing query definitions;
      for each query definition in the plurality of query definitions, identifying question phrases in the resources that match the query definition; and
   storing the answer terms and answer term weights in association with one or more queries comprises storing the answer terms and answer term weights in association with the query definition.

3. The method of claim 1, wherein generating, from the terms of the answers, answer terms and for each answer term, an answer term weight, comprises generating an answer term vector that includes the answer terms and for each answer term, the answer term weight.

4. A method performed by data processing apparatus, the method comprising:
   accessing resource data describing a set of resources;
   identifying question phrases in the resources;
   for each identified question phrase in a resource, selecting in the resource a section of text subsequent to the question phrase as an answer, the answer having a plurality of terms;
   grouping the question phrases into groups of question phrases, and for each group:
      generating, from the terms of the answers for each question phrase in the group, answer terms and for each answer term, an answer term weight; and
      storing the answer terms and answer term weights in association with one or more queries;
   wherein generating, from the terms of the answers, answer terms and for each answer term, an answer term weight, comprises generating an answer term vector that includes the answer terms and for each answer term, the answer term weight; and
   further comprising:
   receiving a query determined to be a question query that seeks an answer response;
   receiving candidate answer passages, each candidate answer passage being text selected from a resource determined to be responsive to the query;
   determining a query definition that matches the received query;
   selecting the answer term vector associated with the query definition that matches the query;
   scoring each candidate answer passages based on terms of the candidate answer passage; and
   selecting an answer passage from the candidate answer passages based, in part, on the scoring of the candidate answer passages based on the selected answer term vector.

5. The method of claim 4, wherein generating, from the terms of the answers, an answer term vector that includes the answer terms and for each answer term, an answer term weight, comprises determining, for each term, the answer term weight based on the number of times the answer term occurs in the answer.

6. The method of claim 4, wherein generating, from the terms of the answers, an answer term vector that includes the answer terms and for each answer term, an answer term weight, comprises determining, for each term, the answer term weight based on the number of answers the answer term occurs.

7. The method of claim 2, wherein the query definition is a query retrieved from a query log.

8. The method of claim 2, wherein the query definition is a set of queries that are determined to be a set of similar queries.

9. The method of claim 8, wherein identifying question phrases in the resource that match the query definition comprises identifying a question phrase having a threshold similarity to at least one of the queries in the set of similar queries.

10. The method of claim 8, wherein generating an answer term weight comprises determining, for an occurrence of the term in an answer, a weight contribution that is proportional the similarity of the least one query to the question phrase to which the text of the answer is subsequent.

11. The method of claim 2, wherein:
the query definition is a set of query terms; and
identifying question phrases in the resource that match the query definition comprises identifying a question phrase that includes an interrogative term and additional terms that are determined to meet a threshold match score that measures the match of the addition terms to the query definition.

12. The method of claim 1, wherein generating, from the terms of the answers, answer terms and for each answer term, an answer term weight comprises determining, for each answer term, the answer term weight based on the number of answers the in which the answer term occurs.

13. A system, comprising:
a data processing apparatus; and
a memory storage system coupled to the data processing apparatus and storing instructions executable by the data processing apparatus and that upon such execution cause the data processing apparatus to perform operations comprising:
accessing resource data describing a set of resources;
identifying question phrases in the resources;
for each identified question phrase in a resource, selecting in the resource a section of text subsequent to the question phrase as an answer, the answer having a plurality of terms;
grouping the question phrases into groups of question phrases, and for each group:
generating, from the terms of the answers for each question phrase in the group, answer terms and for each answer term, an answer term weight; and
storing the answer terms and answer term weights in association with one or more queries;
grouping the question phrases into groups of question phrases comprises:
accessing query definitions;
for each query definition in the plurality of query definitions, identifying question phrases in the resources that match the query definition; and
storing the answer terms and answer term weights in association with one or more queries comprises storing the answer terms and answer term weights in association with the query definition.

14. The system of claim 13, wherein generating, from the terms of the answers, answer terms and for each answer term, an answer term weight, comprises generating an answer term vector that includes the answer terms and for each answer term, the answer term weight.

15. A system, comprising:
a data processing apparatus; and
a memory storage system coupled to the data processing apparatus and storing instructions executable by the data processing apparatus and that upon such execution cause the data processing apparatus to perform operations comprising:
accessing resource data describing a set of resources;
identifying question phrases in the resources;
for each identified question phrase in a resource, selecting in the resource a section of text subsequent to the question phrase as an answer, the answer having a plurality of terms;
grouping the question phrases into groups of question phrases, and for each group:
generating, from the terms of the answers for each question phrase in the group, answer terms and for each answer term, an answer term weight; and
storing the answer terms and answer term weights in association with one or more queries;
wherein generating, from the terms of the answers, answer terms and for each answer term, an answer term weight, comprises generating an answer term vector that includes the answer terms and for each answer term, the answer term weight;
receiving a query determined to be a question query that seeks an answer response;
receiving candidate answer passages, each candidate answer passage being text selected from a resource determined to be responsive to the query;
determining a query definition that matches the received query;
selecting the answer term vector associated with the query definition that matches the query;
scoring each candidate answer passages based on terms of the candidate answer passage; and
selecting an answer passage from the candidate answer passages based, in part, on the scoring of the candidate answer passages based on the selected answer term vector.

16. The system of claim 15, wherein generating, from the terms of the answers, an answer term vector that includes the answer terms and for each answer term, an answer term weight, comprises determining, for each term, the answer term weight based on the number of times the answer term occurs in the answer.

17. The system of claim 15, wherein generating, from the terms of the answers, an answer term vector that includes the answer terms and for each answer term, an answer term weight, comprises determining, for each term, the answer term weight based on the number of answers the answer term occurs.

18. A memory storage system storing instructions executable by a data processing apparatus and that upon such execution cause the data processing apparatus to perform operations comprising:
accessing resource data describing a set of resources;
identifying question phrases in the resources;
for each identified question phrase in a resource, selecting in the resource a section of text subsequent to the question phrase as an answer, the answer having a plurality of terms;
grouping the question phrases into groups of question phrases, and for each group:
generating, from the terms of the answers for each question phrase in the group, answer terms and for each answer term, an answer term weight; and
storing the answer terms and answer term weights in association with one or more queries;

wherein:

grouping the question phrases into groups of question phrases comprises clustering the question phrases into clusters based on one or more cluster similarity metrics; and storing the answer terms and answer term weights in association with one or more queries comprises:

identifying queries that meet a threshold similarity measure a corresponding cluster of question phrases; and storing, in association with the query definition, the answer terms and answer term weights generated from the answers selected in response to the question phrases belonging to the cluster.

* * * * *